(12) United States Patent
Kim et al.

(10) Patent No.: US 9,094,192 B2
(45) Date of Patent: Jul. 28, 2015

(54) METHOD OF AND APPARATUS FOR SHARING SECRET INFORMATION BETWEEN DEVICE IN HOME NETWORK

(75) Inventors: Hyoung-shick Kim, Suwon-si (KR); Seung-jae Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 958 days.

(21) Appl. No.: 12/194,079

(22) Filed: Aug. 19, 2008

(65) Prior Publication Data
US 2009/0055648 A1 Feb. 26, 2009

(30) Foreign Application Priority Data
Aug. 20, 2007 (KR) .................. 10-2007-0083494

(51) Int. Cl.
H04L 9/08 (2006.01)
H04L 29/06 (2006.01)

(52) U.S. Cl.
CPC ............ H04L 9/0847 (2013.01); H04L 9/0863 (2013.01); H04L 63/06 (2013.01); H04L 63/1466 (2013.01); H04L 63/1441 (2013.01)

(58) Field of Classification Search
CPC ... H04L 9/32; H04L 29/06816; H04L 9/3273; H04L 9/0847; H04L 63/06; H04L 63/1466; H04L 63/1441
USPC ............. 713/171, 170; 380/200, 201, 216, 44
See application file for complete search history.

(56) References Cited

U.S. PATENT DOCUMENTS

| | | | | |
|---|---|---|---|---|
| 5,915,018 A | * | 6/1999 | Aucsmith | 380/201 |
| 6,065,120 A | * | 5/2000 | Laursen et al. | 726/5 |
| 6,192,474 B1 | | 2/2001 | Patel et al. | |
| 6,345,098 B1 | * | 2/2002 | Matyas et al. | 380/46 |
| 6,886,096 B2 | * | 4/2005 | Appenzeller et al. | 713/170 |
| 6,978,025 B1 | * | 12/2005 | Price, III | 380/282 |
| 7,003,117 B2 | * | 2/2006 | Kacker et al. | 380/277 |
| 7,047,408 B1 | | 5/2006 | Boyko et al. | |
| 7,103,911 B2 | | 9/2006 | Spies et al. | |
| 7,424,115 B2 | * | 9/2008 | Hyyppa et al. | 380/44 |
| 7,499,544 B2 | | 3/2009 | Jao et al. | |
| 7,519,681 B2 | * | 4/2009 | Edwards et al. | 709/217 |

(Continued)

FOREIGN PATENT DOCUMENTS

| | | |
|---|---|---|
| JP | 256136 A | 2/1990 |
| JP | 2000-78124 A | 3/2000 |

(Continued)

OTHER PUBLICATIONS

Communication issued May 26, 2011 in counterpart Russian Application No. 2010106080/90.

(Continued)

Primary Examiner — Jung Kim
Assistant Examiner — Thomas Ho
(74) Attorney, Agent, or Firm — Sughrue Mion, PLLC

(57) ABSTRACT

A method and apparatus for sharing secret information between devices in a home network are provided. In the method and apparatus, home network devices receive a password (credential) input by a user and encrypt secret information based on the credential by using keys generated according to a predetermined identity-based encryption (IBE) scheme. Accordingly, it is possible to securely share the secret information between home network devices without any certificate authority or certificate.

26 Claims, 8 Drawing Sheets

(56) References Cited

U.S. PATENT DOCUMENTS

| | | | |
|---|---|---|---|
| 7,743,042 B2* | 6/2010 | Kim | 707/705 |
| 7,770,219 B2* | 8/2010 | Chen | 726/20 |
| 7,779,030 B2* | 8/2010 | Jin et al. | 707/769 |
| 7,818,587 B2* | 10/2010 | Drew et al. | 713/193 |
| 7,831,829 B2 | 11/2010 | Appenzeller et al. | |
| 7,860,247 B2* | 12/2010 | McCullagh et al. | 380/44 |
| 2003/0081785 A1* | 5/2003 | Boneh et al. | 380/277 |
| 2005/0021942 A1 | 1/2005 | Diehl et al. | |
| 2005/0058294 A1 | 3/2005 | Chen et al. | |
| 2005/0120246 A1 | 6/2005 | Jang et al. | |
| 2006/0026424 A1 | 2/2006 | Eto | |
| 2007/0104323 A1 | 5/2007 | Hammell et al. | |
| 2007/0174301 A1 | 7/2007 | Kim et al. | |
| 2011/0153823 A1 | 6/2011 | Kim et al. | |
| 2013/0042107 A1 | 2/2013 | Eto | |

FOREIGN PATENT DOCUMENTS

| | | | |
|---|---|---|---|
| JP | 2001-313634 A | 11/2001 | |
| JP | 2005500740 A | 1/2005 | |
| JP | 2005-530368 A | 10/2005 | |
| JP | 2006-506908 A | 2/2006 | |
| JP | 2007-183935 A | 7/2007 | |
| JP | 2008-508595 A | 3/2008 | |
| WO | 2006/049832 A2 | 5/2006 | |
| WO | 2006127229 A2 | 11/2006 | |
| WO | 2007011897 A2 | 1/2007 | |

OTHER PUBLICATIONS

Office Action, dated Nov. 3, 2011, issued by the State Intellectual Property Office of P.R. China in corresponding Chinese Application No. 200880024834.9.

Communication dated Feb. 12, 2013 issued by the Japanese Patent Office in counterpart Japanese Patent Application No. 2010-521768.

Wen et al; "Provably secure three-party password-based authenticated key exchange protocol using Weil pairing"; IEEE Proceedings Communications, Apr. 2005, vol. 153, No. 2, pp. 138-143.

Communication issued Jun. 4, 2013, issued by the Japanese Patent Office in counterpart Japanese Application No. 2010-521768.

Communication dated Apr. 30, 2014 issued by the Korean Intellectual Property Office in counterpart Korean Patent Application No. 10-2007-0083494.

Communication dated Nov. 14, 2014 issued by the European Patent Office in counterpart European Patent Application No. 08793171.3.

Christian Gehrmann et al.; "Manual Authentication for Wireless Devices"; RSA Laboratories Cryptobytes; vol. 7; No. 1; Jun. 1, 2004; 11 pages total; XP007908239.

Lein Harn et al.; "ID-Based Cryptographic Schemes for User Identification, Digital Signature, and Key Distribution"; IEEE Journal on Selected Areas in Communications; vol. 11; No. 5; Jun. 1993; pp. 757-760; XP002933974.

Liqun Chen et al.; "Identity Based Authenticated Key Agreement Protocols from Paintings"; International Association for Cryptologic Research; vol. 20040527:132248; May 27, 2004; 21 pages total; XP061000425.

Serge Vaudenay; "Secure Communications over Insecure Channels Based on Short Authenticated Strings"; Advances in Cryptology—Crypto 2005 Lecture Notes in Computer Science; Aug. 14, 2005; pp. 309-326; XP047030110.

* cited by examiner

FIG. 7B

```
<device xmlns:rui=urn:schemas-ce-org:cea2014-server-ext-1-0\>
<deviceType>
    urn:schemas-ce-org:device:RemoteUIServerDevice:1
</deviceType>
     ... ...
<friendlyName>
    My DVD Player      <!-- device name -->
</friendlyName>
<rui:uiServerInfo>
<rui:uiListURL>
    http://1.3.4.5:5910/
</rui:uiListURL>
     ... ...
<rui:masterPublicKey>
    XXXX        <!-- master public key sP -->
</rui:masterPublicKey>
</rui:uiServerInfo>
<serviceList/>
</device>
```

FIG. 7C

```
<html>
<header>
    <type private="true" >
    </type>
</header>
<body>
    ...
    <secure>
        <input type="password">
    </secure>
    ...
</body>
</html>
```

METHOD OF AND APPARATUS FOR SHARING SECRET INFORMATION BETWEEN DEVICE IN HOME NETWORK

CROSS-REFERENCE TO RELATED PATENT APPLICATION

This application claims the benefit of Korean Patent Application No. 10-2007-0083494, filed on Aug. 20, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a home network, and more particularly, to sharing secret information between devices in a home network.

2. Description of the Related Art

Many industrial standard associations such as digital living network alliance (DLNA), home audio-video interoperability (HAVi), and universal plug and plug (UPnP) have actively researched home network technologies.

A remote user interface (RUI) technology for allowing one device to control functions of other devices is used in home networks. The RUI technology is based on a client-server architecture. In the RUI technology, an RUI client fetches a user interface (UI) from an RUI server, and a user controls the RUI server through the UI on the RUI client.

In a home network environment, the user can use an e-commerce service, a home shopping service, or the like through the RUI. Security vulnerability of the current RUI technology may cause the risk of exposure of important personal information such as social security numbers or credit card numbers to an attacker. For example, when protocol stacks for a home shopping service are provided through only an RUI supporting settop box, a user fetches the RUI of the settop box for an RUI supporting TV so as to use the RUI for the home shopping service. At this time, important personal information may be transmitted and received between the TV and the settop box, and the personal information may be exposed to an attacker existing in the home network. Therefore, a method of securely transmitting and receiving messages between home network devices is required. Accordingly, it is important to share secret information such as a session key between the home network devices without exposure to the attacker.

FIG. 1 is a view illustrating a man-in-the-middle (MITM) attack in a remote desktop protocol (RDP).

As shown in FIG. 1, a client that attempts to access a server is unknowingly made to access an attacker's device with domain name service (DNS) spoofing, address resolution protocol (ARP) poisoning, or the like. Initially, the server and the client attempt to exchange random numbers Rs and Rc for generating a session key. At this time, the attacker intercepts a public key and the random number Rs of the server and transmits a fake public key P encrypted with another random number Rs' to the client. The client accepts the fake public key encrypted with the random number Rs+ as a true public key of the server and transmits the encrypted random number Rs. The attacker acquires the random number Rc of the client by decrypting a message transmitted from the client and transmits the random number Rc encrypted with the public key to the server. As a result, the attacker can sniff all the messages between the server and the client.

In order to prevent the attack, in a public key infrastructure (PKI), a certificate is used to determine whether or not the public key of the server is fake. However, in the case of using the certificate, a certificate authority is required. In addition, in the client, a process for authenticating the certificate involves a large amount of calculation, which results in a burden on the home network. Therefore, there is a need for a method of securely sharing secret information between home network devices with a small amount of calculation without any certificate.

SUMMARY OF THE INVENTION

The present invention provides an apparatus and method of securely sharing secret information between home network devices without any certificate.

According to the present invention, it is possible to implement sharing of secret information between home network devices through a secure session without any certificate authority or certificate. Accordingly, it is possible to reduce traffic for certificate exchange in a home network and to avoid complicated calculations for certificate verification in the home network devices.

BRIEF DESCRIPTION OF THE DRAWINGS

The above and other features and advantages of the present invention will become more apparent by describing in detail exemplary embodiments thereof with reference to the attached drawings in which:

FIG. 7B is a view illustrating a universal plug and play (UPnP) device description of the first device in the third exemplary embodiment of the present invention; and FIG. 7C is a view illustrating a consumer electronics (CE) HTML page which the first device provides as a user interface (UI) object to the second device in the third exemplary embodiment of the present invention.

DETAILED DESCRIPTION OF EXEMPLARY EMBODIMENTS OF THE INVENTION

In the present invention, home network devices generate keys based on personal information input by a user according to an identity based encryption (IBE) scheme.

The IBE scheme is a public key encryption system for enabling any string to be used as a valid public key. In the IBE scheme, a message transmitter can transmit a message encrypted with arbitrary information representing an identity of a message receiver. For example, the transmitter can use an e-mail address of the receiver as a public key.

The receiver decrypts the encrypted message with a secret key, which can be acquired from a reliable third party. The third party is called a private key generator (PKG). The secret key can be calculated from a master key, that is, secret information possessed only by the PKG. The IBE scheme is disclosed in many documents such as an article, titled "Identity based encryption from the Weil pairing" by D. Boneh and M. Franklin. A detailed description thereof will be omitted here.

The present invention will now be described more fully with reference to the accompanying drawings, in which exemplary embodiments of the invention are shown.

Figure 1:
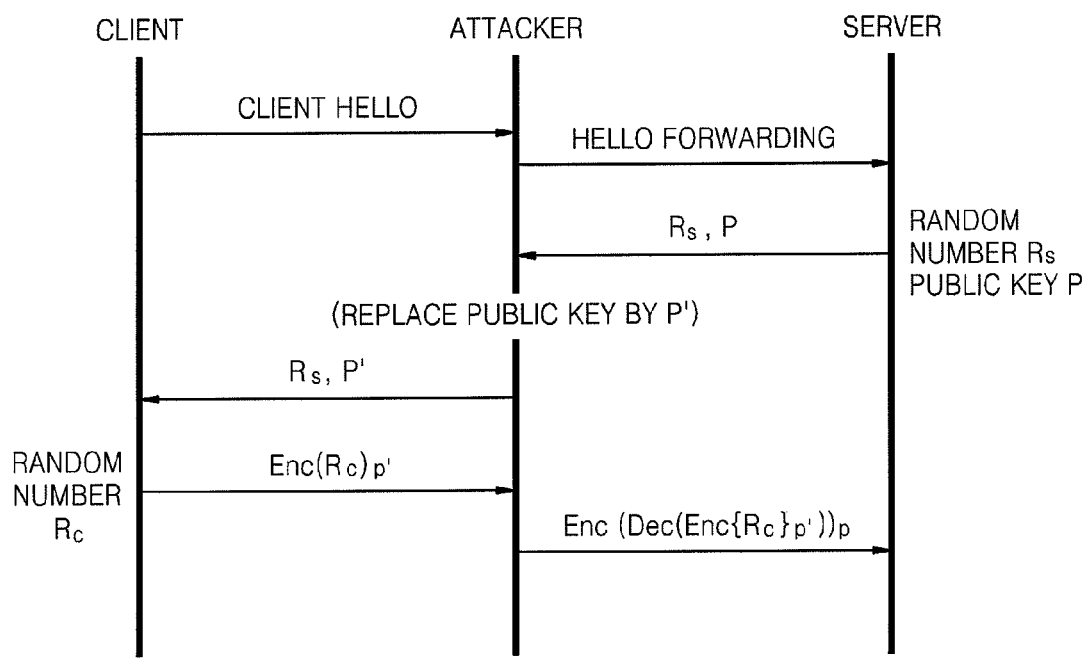
FIG. 1 is a view for explaining a man-in-the-middle attack in a remote desktop protocol (RDP)
Figure 2:
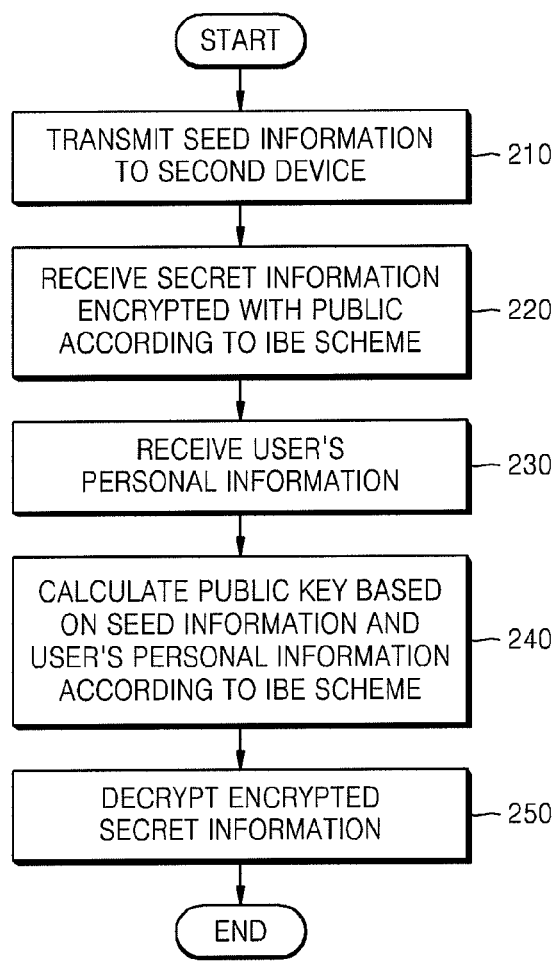
FIG. 2 is a flowchart illustrating a method of a first device securely receiving secret information from a second device in a home network according to an exemplary embodiment of the present invention.

FIG. 2 is a flowchart illustrating a method of a first device securely receiving secret information from a second device in a home network according to an embodiment of the present invention.

In operation 210, a first device transmits seed information to a second device. The seed information collectively refers to information that the second device uses to generate the public key of the first device. The seed information may include the master key of the first device, IBE parameters, identification information of the first device, and the like used in the IBE scheme.

In a case where the first and second devices are universal plug and play (UPnP) devices, the seed information may be provided to the second device through a device description message of the first device.

In addition, in a case where the first device is a remote user interface (RUI) server and the second device is an RUI client, the seed information may include a UI object that the first device provides to the second device. In this case, the integrity of the UI object is secured. A detailed description thereof will be given later.

In operation 220, the first device receives encrypted secret information from the second device. The encrypted secret information is generated by encryption using the public key of the first device. The second device calculates the public key of the first device by using predetermined seed information and a credential. Therefore, the user needs to input an additional credential to the second device.

The secret information should be shared between the first and second devices, but it is not limited to a specific use and type. For example, a session key to be used for communication between the first and second devices may be included in the secret information.

In operation 230, the first device receives the personal information input by the user. The user's personal information is information such as a password that only the user knows. Hereinafter, the user's personal information is referred to as a credential.

In operation 240, the first device generates the secret key based on the seed information and the credential according to the IBE scheme. The IBE scheme used in the process is the same as the IBE scheme used in the process of the second device calculating the public key of the first device.

In the present embodiment, since the first device generates the secret key according to the IBE scheme, it is assumed that the PKG is embedded in the first device or a secure communication channel exists between the first device and an external PKG. The same assumption is applied in the following description.

In operation 250, the first device decrypts the encrypted secret information based on the secret key.

Due to the aforementioned processes, although an attacker acquires all the information transmitted and received between the first and second devices, the attacker cannot know the user's credential, and thus the attacker cannot calculate the public key accurately. As a result, the first device fails to decrypt the secret information with the secret key that the first device calculates, and thus the first device cannot authenticate the counter party as a true second device. In addition, in a case where the UI object is counterfeited, the first device fails to decrypt the secret information, and thus the integrity of the UI object can be secured.

Therefore, according to the present invention, a separate mechanism (for example, a message authentication code (MAC)) for securing the integrity of the message transmitted and received between the devices need not be used.

In addition, in a case where the message received in operation 220 is not a message encrypted based on the secret information but is a message encrypted with the public key based on device identification information of the first device as well as the secret information according to the IBE scheme, the first device can compare a result of decryption of the message with the identification information of the first device, so that the first device can more accurately authenticate the counter party.

Figure 3:
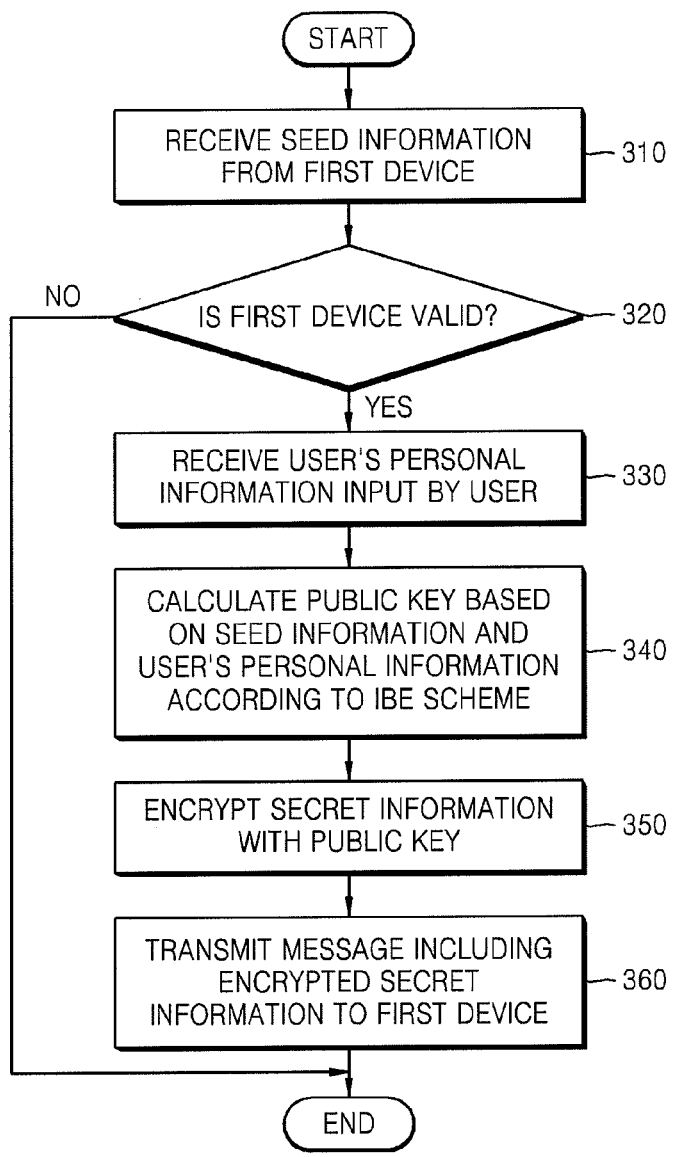
FIG. 3 is a flowchart illustrating a method of a second device securely transmitting secret information to a first device in a home network according to another exemplary embodiment of the present invention.

FIG. 3 is a flowchart illustrating a method of a second device securely transmitting secret information to a first device in a home network according to another embodiment of the present invention.

In operation 310, the second device receives the seed information from the first device. As described above, the seed information may include the master public key of the first device, the IBE parameters, the identification information of the first device, and the like used in the IBE scheme.

In addition, in a case where the first device is an RUI server and the second device is an RUI client, the seed information may include a UI object that the first device provides to the second device.

In operation 320, the second device determines based on the identification information of the first device included in the seed information and a revoked device list whether or not the first device is an invalid device that is removed from the home network. The revoked device list is a database of registering device identification information of the devices that the user revokes. The revoked device list may be stored in the second device or in remote storage. Since the second device performs the determination operation, the user that lost a home network device or removed a device from the home network can register the device identification information of the associated device in the revoked device list instead of changing a credential. Preferably, but not necessarily, the device identification information is registered in the revoked device list in a digest format calculated by using the user's credential.

In operation 330, the second device receives the user's personal information, that is, the credential input by the user.

In operation 340, the second device calculates the public key of the first device based on the seed information and the credential according to the IBE scheme.

In operation 350, the second device encrypts the secret information with the public key calculated according to the IBE scheme. As described above, the session key to be used for communication between the first and second devices may be included in the secret information.

In operation 360, the second device transmits a message including the encrypted secret information to the first device.

As described above, the message may be encrypted with the public key based on the secret information and the device identification information of the first device according to the IBE scheme. In this case, the first device can compare a result of decryption of the message with the identification information of the first device to determine whether or not false credentials are used for calculation of the public key or whether or not the UI object is counterfeited by an attacker.

Figure 4:
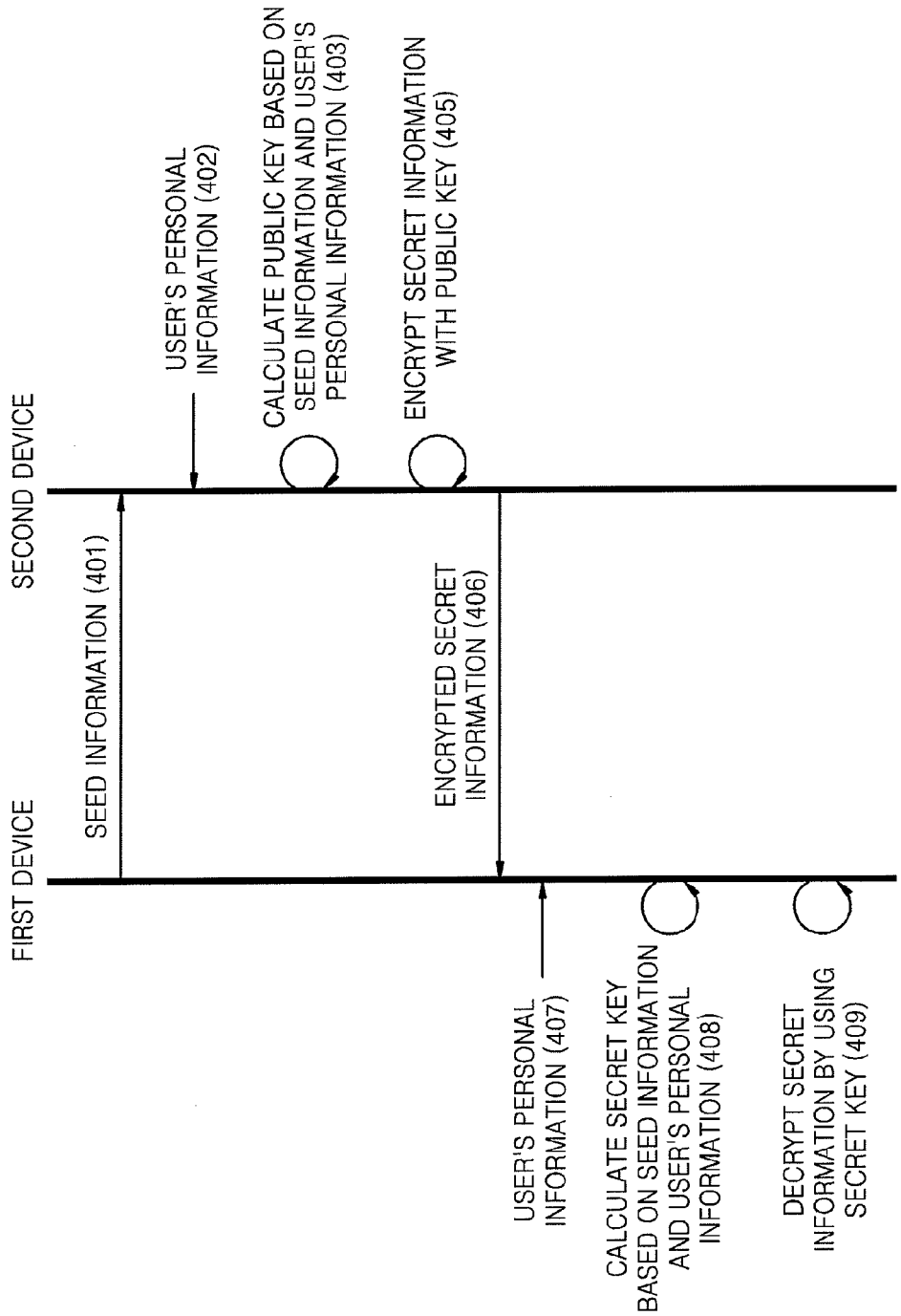
FIG. 4 is a flowchart for explaining a communication method between first and second devices according to a first exemplary embodiment of the present invention.

FIG. 4 is a flowchart for explaining a communication method between first and second devices according to a first embodiment of the present invention.

In operation 401, the first device transmits the seed information to the second device.

In operation 402, the user inputs the credential to the second device.

In operation 403, the second device calculates the public key of the first device based on the seed information and the credential according to the IBE scheme.

In operation 405, the second device encrypts the secret information with the public key.

In operation 406, the second device transmits the encrypted secret information to the first device.

In operation 407, the user inputs the credential to the first device.

In operation 408, the first device calculates the secret key based on the seed information transmitted to the second device in operation 401 and the credential input by the user in operation 407 according to the IBE scheme.

In operation 409, the first device decrypts the encrypted secret information by using the secret key.

Figure 5:
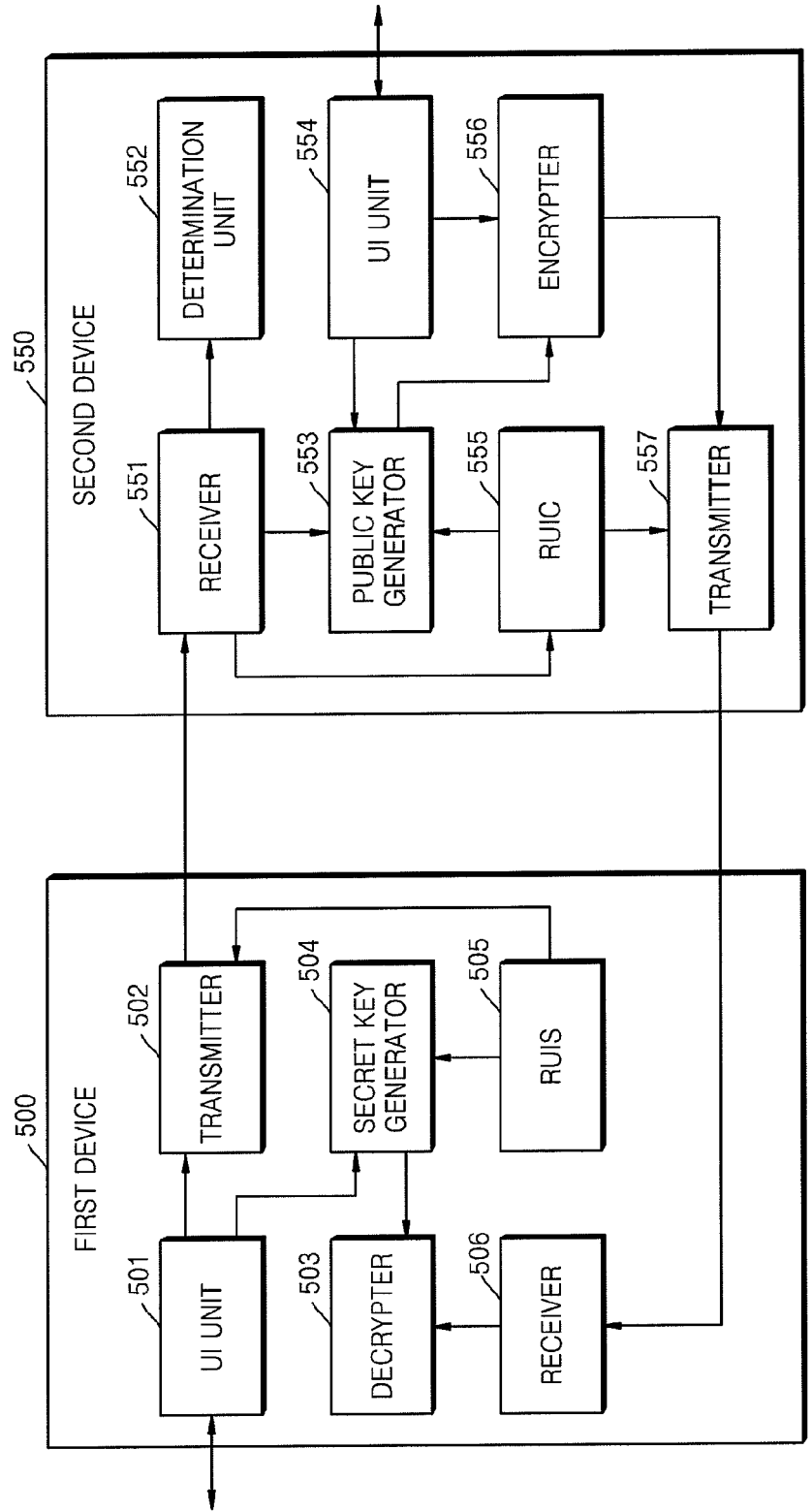
FIG. 5 is a view illustrating configurations of the first and second devices communicating with each other in the home network according to the first exemplary embodiment of the present invention.

FIG. 5 is a view illustrating configurations of first and second devices 500 and 550 communicating with each other in the home network according to the first embodiment of the present invention.

As shown in FIG. 5, the first device 500 includes a UI unit 501, a transmitter 502, a decrypter 503, a secret key generator 504, an RUI server 505, and a receiver 506.

The UI unit 501 receives the credential input by the user. In addition, the UI unit 501 may receive device identification information such as a device name.

The transmitter 502 transmits the seed information such as IBE parameters to the second device 550. As described above, the seed information may include a UI object that the RUI server 505 provides to an RUI client 555 of the second device 550. In a case where the first and second devices 500 and 550 are universal plug and play (UPnP) devices, the transmitter 502 provides the seed information to the second device 550 through a device description message of the first device 500.

The secret key generator 504 calculates the secret key based on the credential and the UI object according to a predetermined IBE scheme.

The receiver 506 receives the secret information encrypted with the public key according to the IBE scheme from the second device 550. As described above, the message received from the second device 550 is generated by encrypting the secret information and the device identification information with the public key.

The decrypter 503 decrypts the encrypted secret information by using the secret key calculated by the secret key generator 504. In a case where the encrypted secret information is encrypted together with the device identification information of the first device 500, the first device 500 attempts to decrypt the device identification information by using the secret key calculated according to the IBE scheme to determine whether or not to obtain the accurate device identification information of the first device 500 so as to authenticate the first device 500.

The second device 550 includes a receiver 551, a determination unit 552, a public key generator 553, a UI unit 554, an RUI client 555, an encrypter 556, and a transmitter 557.

The receiver 551 receives the seed information from the first device 500.

The determination unit 552 compares the device identification information of the first device 500 included in the seed information with the predetermined revoked device list to determine whether or not the first device 500 is a valid device. If the first device 500 is determined to be registered in the revoked device list, the second device 550 terminates communication with the first device 500.

The UI unit 554 receives the credential input by the user.

The RUI client 555 receives the UI object from the RUI server 505 of the first device 500.

The public key generator 553 calculates the public key of the first device 500 based on the seed information, the credential, and the UI object according to the IBE scheme.

The encrypter 556 encrypts the secret information with the public key calculated by the public key generator 553. Preferably, but not necessarily, the secret information together with the device identification information of the first device 500 is encrypted.

The transmitter 557 transmits a message generated as a result of the encryption to the first device 500.

Figure 6:
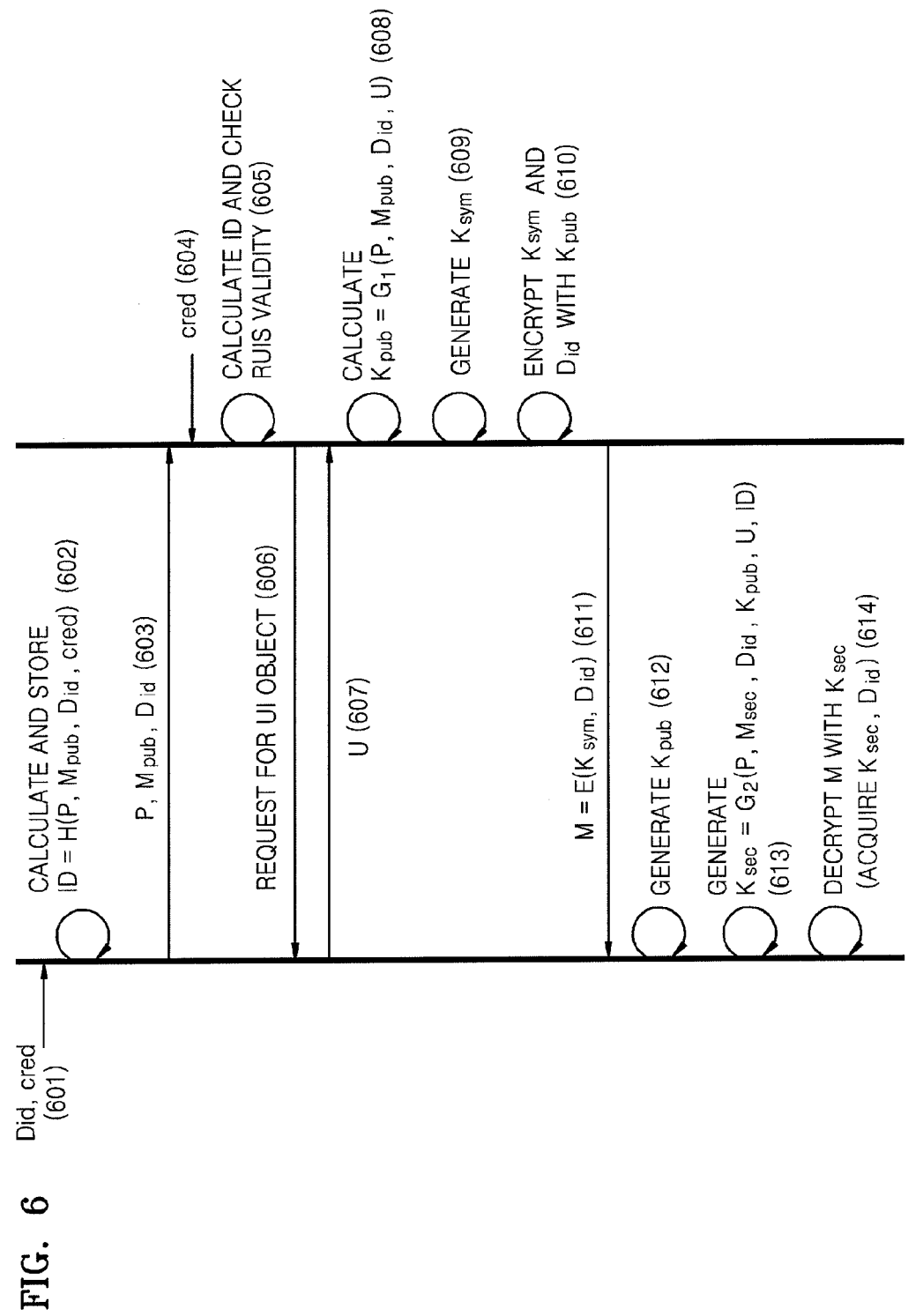
FIG. 6 is a flowchart for explaining a communication method between first and second devices according to a second exemplary embodiment of the present invention.

FIG. 6 is a flowchart for explaining a communication method between first and second devices according to a second embodiment of the present invention.

As shown in FIG. 6, the first device is an RUI server, and the second device is an RUI client.

In operation 601, a user designates a device name Did and a credential to the first device and inputs the device name and credential to the first device.

In operation 602, the first device stores the credential in a digest form, for example, H(P, Mpub, Did, cred). Since the credential H can be a value unique to a home network device, the credential H is referred to as an ID. Here, P denotes a set of parameters (for example, binary mapping) of the IBE scheme to be used by the first and second devices, and Mpub is a master public key of the first device to be used for generating a key according to the IBE scheme. H is a secure one-way function and is shared between the first and second devices.

In operation 603, the first device transmits the IBE scheme parameters P, the master public key Mpub of the first device, and the device name Did to the second device. As described above, in a case where the first and second devices are UPnP devices, the information may be transmitted to the second device by using a discovery protocol used in the UPnP network.

In operation 604, the second device receives the user's credential input by the user.

In operation 605, the second device calculates ID=H(P, Mpub, Did, cred) and determines whether or not the calculated value is registered in the revoked device list so as to check the validity of the first device. If the same value as the calculated value is in the revoked device list, the first device is determined not to be included in the user's domain, and thus the second device terminates communication with the first device. In the current embodiment, it is assumed that the first device is a valid device.

In operation 606, the second device that is an RUI client requests the first device that is an RUI server for an UI object U. In operation 607, the second device receives the UI object from the first device.

In operation 608, the second device calculates the public key Kpub by using P, Mpub, ID, U, and a predetermined public key generating function G1 according to the IBE scheme.

In operation 609, the second device selects a random number as a session key Ksym. In the embodiment, the session key Ksym is secret information that is to be shared between only the first and second devices.

In operation 610, the second device encrypts the session key Ksym and the device name Did of the first device by using the public key according to the IBE scheme.

In operation 611, the second device transmits a message generated as a result of the encryption to the first device.

In operation 612, the first device also calculates the public key Kpub by using the same processes as the second device performs in operation 608.

In operation 613, the first device calculates secret key Ksec by using P, Msec, Kpub, ID, U, and a predetermined secret key generating function G2 according to the IBE scheme.

In operation 614, the first device decrypts a received message with the secret key Ksec. As a result of the decryption, if the valid device name Did of the first device is not acquired, the first device determines that one of the messages (for example, an UI object) exchanged between the first and second devices is counterfeited by an attacker, and thus the first device terminates communication with the second device. Therefore, only if the first device acquires the valid device name thereof, does the first and second devices use the session key Ksym.

According to the current embodiment of the present invention, even in a case where the attacker acquires all the information exchanged between the first and second devices, the attacker cannot calculate the session key without knowledge of the user's credential. In addition, even in a case where the attacker counterfeits a message between the first and second devices, the first device can detect the counterfeited message and terminate communication with the second device. Therefore, the worst situation the attacker can cause is authentication failure between the first and second devices.

Figure 7A:
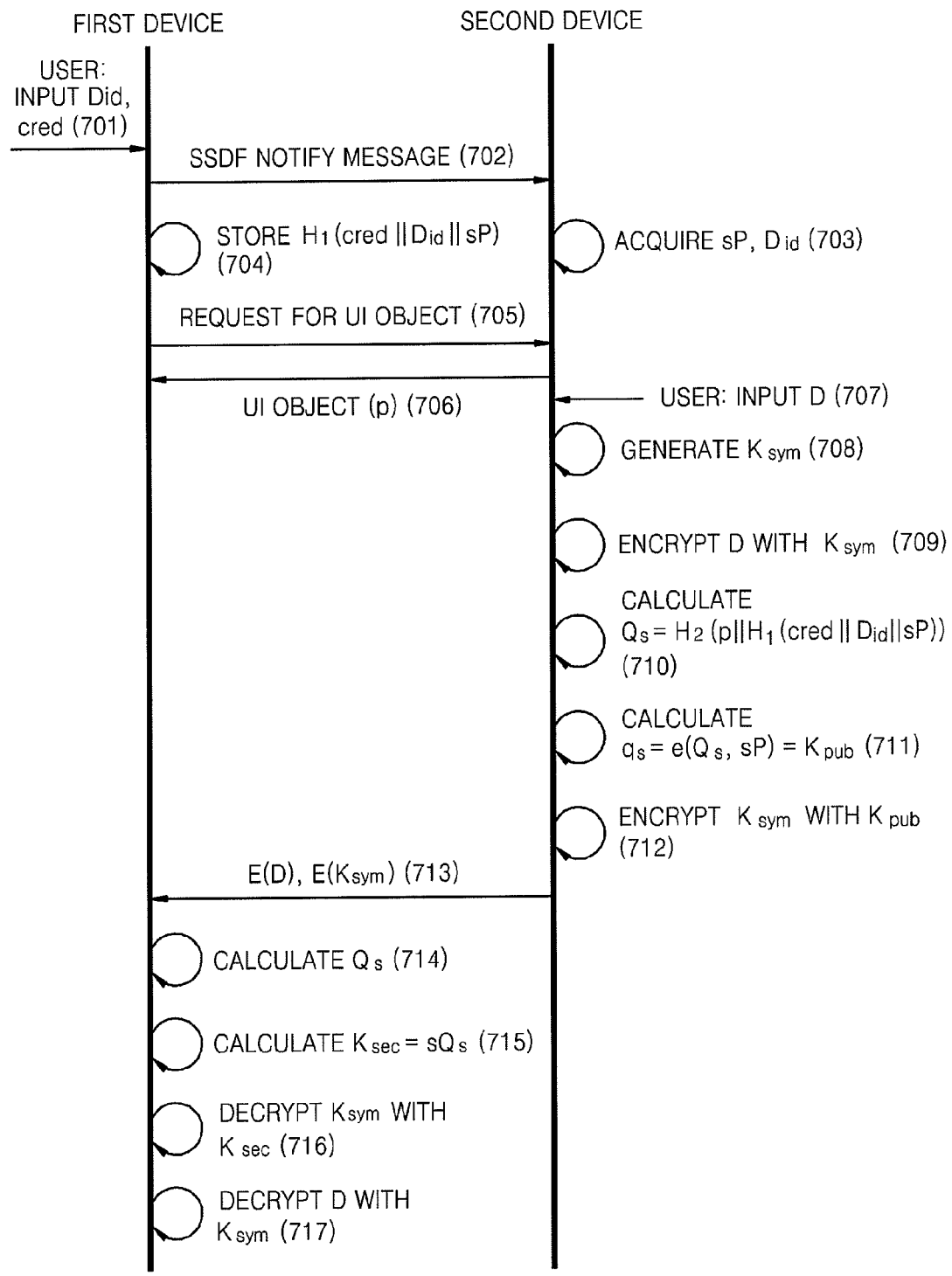
FIG. 7A is a flowchart for explaining a communication method between first and second devices according to a third exemplary embodiment of the present invention.

FIG. 7A is a flowchart for explaining a communication method between first and second devices according to a third embodiment of the present invention.

In the current embodiment, the first device is an RUI server, and the second device is an RUI client. CEA-2014, a home network standard of the Consumer Electronics Association (CEA), is applied to the embodiment. The CEA-2014 provides a browser-based communication method in a UPnP home network. Devices according to the CEA-2014 provide the UI as web pages described in the CE-HTML standard that is a specific version of HTML.

In addition, in the current embodiment, the IBE scheme proposed by D. Boneh and M. Franklin is employed. In the IBE scheme, bilinear Diffie-Helman assumption and a random oracle model are used. A detailed description thereof is disclosed in the aforementioned document, titled "Identity based encryption from the Weil pairing."

In the current embodiment, the first device is embedded with an elliptic curve group G1 of prime orders q and a finite field G2 of prime orders q having a binary mapping relationship $e:G_1 \times G_2 \rightarrow G_2$, a binary mapping e, a generator P, a master secret key $s \in_R \mathbb{Z}^*_q$, and a corresponding master public key sP.

In operation 701, a user inputs a device name Did and a credential cred to the first device. For example, the user can designate the device name Did as "My DVD Player."

In operation 702, the first device multicasts a message SSDF NOTIFY to all control points in the home network by using a UPnP discovery protocol mechanism in order to broadcast services and embedded devices. Due to the discovery operation, the second device acquires a uniform resource locator (URL) for the device description of the first device and, finally, the actual device description of the first device.

FIG. 7B is a view illustrating the device description of the first device in the third embodiment of the present invention. As shown in FIG. 7B, the device description includes the master public key and the device name of the first device. Namely, in operation 703, the second device acquires the master public key Sp and the device name Did through the device description.

Referring back to FIG. 7A, in operation 704, the first device stores the user's credential cred in a digest form $H_1(\text{cred}\|d_{id}\|sP)$ by using the random oracle H1.

In operation 705, the second device that is an RUI client requests the first device for the UI object. In operation 706, the first device transmits the UI object p that is a CE-HTML page to the second device.

FIG. 7C is a view illustrating an example of the UI object. As shown in FIG. 7C, the UI object p is requested to be transmitted to the second device through a secure session by using an html tag <secure>.

Referring back to FIG. 7A, in operation 707, the user inputs to-be-transmitted secret information. In operation 708, the second device generates the session key Ksym. The session key Ksym may be selected as an arbitrary value.

In operation 709, the second device encrypts the secret information with the session key Ksym.

In operation 710, the second device calculates an eigen value Qs of the first device by using the following equation.

$$Qs = H_2(p\|H_1(\text{cred}\|d_{id}\|sP))$$

Here, $H_2:\{0,1\}^* \rightarrow G_1$ is a random oracle.

In operation 711, the second device calculates a mapping result $g_s$ using the eigen value Qs by using the following equation.

$$g_s = e(Q_s, sP)$$

The mapping result $g_s$ becomes the public key Kpub according to the IBE scheme.

In operation 712, the second device encrypts the session key Ksym with the public key Kpub according to the IBE scheme by using the following equation.

$$Enc(K_{sym})_{K_{pub}} = (rP, K_{sym} \oplus H_3(g_s^r)), r \in_R \mathbb{Z}^*_q$$

Here, $H_3:G_2 \rightarrow \{0,1\}^*$ is a random oracle.

In operation 713, the second device transmits the encrypted secret information and the encrypted session key to the first device through HTTP POST.

In operation 714, the first device calculates the eigen value Qs by using the same process as the second device performs in operation 710.

In operation 715, the first device generates the secret key Ksec according to the IBE scheme by calculating $K_{sec} = sQs$.

In operation 716, the first device decrypts the session key Ksym by using the secret key Ksec.

In operation 717, the first device decrypts the secret information D by using the session key Ksym. As a result, the secret information D can be shared between the first and second devices.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks and optical data storage devices. The invention can also be embodied as computer readable codes on a computer readable transmission medium. An example of the computer readable transmission medium is carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by the ordinarily skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of a first device communicating with a second device in a home network, the method comprising:
    transmitting, by the first device, predetermined seed information to the second device;
    sending a user interface (UI) object to the second device on condition that the validity of the first device is verified by the second device using the seed information and personal information input to the second device by a user;
    receiving, by the first device, a message including secret information encrypted with a predetermined public key from the second device;
    generating, by the first device, a secret key corresponding to the public key; and
    decrypting the secret information included in the message by using the secret key,
    wherein the first device is a remote user interface (RUI) server, and the second device is an RUI client, and
    wherein the public key is generated based on the seed information and the personal information input to the second device by the user by using the UI object by the second device.

2. The method of claim 1,
    wherein the seed information includes device identification information of the first device, and
    wherein the message is obtained by encrypting the secret information and the device identification information of the first device with the public key.

3. The method of claim 1, wherein the seed information includes a master public key of the first device and identity-based encryption (IBE) parameters used in IBE scheme.

4. The method of claim 1,
    wherein the first device and the second device are UPnP (universal plug and play) devices, and
    wherein, in the transmitting of the seed information, the seed information is transmitted to the second device through a device description of the first device.

5. The method of claim 1, wherein the secret information is a session key to be used for communication between the first and second devices.

6. A non-transitory computer-readable medium having embodied thereon a computer program comprising instructions for executing a method of a first device communicating with a second device in a home network, the method comprising:
    transmitting, by the first device, predetermined seed information to the second device;
    sending a user interface (UI) object to the second device on condition that the validity of the first device is verified by the second device using the seed information and personal information input to the second device by a user;
    receiving, by the first device, a message including secret information encrypted with a predetermined public key from the second device;
    generating, by the first device, a secret key corresponding to the public key; and
    decrypting the secret information included in the message by using the secret key,
    wherein the first device is a remote user interface (RUI) server, and the second device is an RUI client, and
    wherein the public key is generated based on the seed information and the personal information input to the second device by the user by using the UI object by the second device.

7. An apparatus for enabling a first device to securely communicate with a second device in a home network, the apparatus comprising:
    a transmitter, of the first device, which transmits a predetermined seed information to the second device;
    a receiver, of the first device, which receives a message including secret information encrypted with a predetermined public key from the second device;
    a secret key generator, of the first device, which generates a secret key corresponding to the public key; and
    a decrypter which decrypts the secret information included in the message by using the secret key,
    wherein the transmitter sends a user interface (UI) object to the second device on condition that the validity of the first device is verified by the second device using the seed information and personal information input to the second device by a user,
    wherein the first device is a remote user interface (RUI) server, and the second device is an RUI client, and
    wherein the public key is generated based on the seed information and the personal information input to the second device by the user by using the UI object by the second device.

8. The apparatus of claim 7,
    wherein the seed information includes device identification information of the first device, and
    wherein the message is obtained by encrypting the secret information and the device identification information of the first device with the public key.

9. The apparatus of claim 7, wherein the seed information includes a master public key of the first device and identity-based encryption (IBE) parameters used in IBE scheme.

10. The apparatus of claim 7,
    wherein the first device and the second device are UPnP (universal plug and play) devices, and
    wherein, the transmitter transmits the seed information to the second device through a device description of the first device.

11. The apparatus of claim 7, wherein the secret information is a session key to be used for communication between the first and second devices.

12. A method of a second device communicating with a first device in a home network, the method comprising:
    receiving, by the second device, predetermined seed information from the first device;
    receiving personal information input to the second device from a user;

authenticating the validity of the first device using the seed information and the personal information;

receiving a user interface (UI) object from the first device when the validity of the first device is verified by the authenticating generating, by the second device, a public key based on the seed information and the personal information input to the second device by the user by using the UI object by the second device;

encrypting the secret information by using the public key;

transmitting a message including the encrypted secret information to the first device.

13. The method of claim 12,
wherein the first device is an RUI (remote user interface) server, and the second device is an RUI client.

14. The method of claim 12,
wherein the seed information includes device identification information of the first device, and
wherein the message is obtained by encrypting the secret information and the device identification information of the first device with the public key.

15. A method of a second device communicating with a first device in a home network, the method comprising:
receiving, by the second device, predetermined seed information from the first device;
generating, by the second device, a public key based on the seed information and personal information input to the second device by a user by using UI object sent from the first device;
encrypting secret information by using the public key;
transmitting a message including the encrypted secret information to the first device;
wherein the seed information includes device identification information of the first device, and
wherein the message is obtained by encrypting the secret information and the device identification information of the first device with the public key; and
determining based on the device identification information and a predetermined list whether or not the first device is a valid device,
wherein, as a result of the determination, only if the first device is valid, performing the generating of the public key, the encrypting of the secret information, and the transmitting of the message.

16. The method of claim 12, wherein the seed information includes a master public key of the first device and IBE parameters used in the IBE scheme.

17. The method of claim 12,
wherein the first device and the second device are UPnP (universal plug and play) devices, and
wherein, in the receiving of the seed information, the seed information is received through a device description of the first device.

18. The method of claim 12, wherein the secret information is a session key to be used for communication between the first and second devices.

19. A non-transitory computer-readable medium having embodied thereon a computer program comprising instructions for executing a method of a second device communicating with a first device in a home network, the method comprising:
receiving, by the second device, predetermined seed information from the first device;
receiving personal information input to the second device from a user;
authenticating the validity of the first device using the seed information and the personal information;

receiving a user interface (UI) object from the first device when the validity of the first device is verified by the authenticating generating, by the second device, a public key based on the seed information and the personal information input to the second device by the user by using the UI object by the second device;

encrypting the secret information by using the public key;

transmitting a message including the encrypted secret information to the first device.

20. An apparatus for enabling a second device to securely communicate with a first device in a home network, the apparatus comprising:
a receiver, of the second device, which receives predetermined seed information from the first device;
a public key generator, of the second device, which generates a public key based on the seed information and personal information input to the second device by a user by using a user interface (UI) object sent from the first device;
an encrypter which encrypts the secret information by using the public key;
a transmitter which transmits a message including the encrypted secret information to the first device, and
a determination unit which authenticates the validity of the first device using the seed information and the personal information input to the second device by the user,
wherein the receiver receives the user interface (UI) object from the first device when the validity of the first device is verified by the authenticating.

21. The apparatus of claim 20,
wherein the first device is an RUI (remote user interface) server, and the second device is an RUI client.

22. The apparatus of claim 20,
wherein the seed information includes device identification information of the first device, and
wherein the message is obtained by encrypting the secret information and the device identification information of the first device with the public key.

23. An apparatus for enabling a second device to securely communicate with a first device in a home network, the apparatus comprising:
a receiver which receives predetermined seed information from the first device;
a public key generator which generates a public key based on the seed information and personal information input to the second device by a user by using a UI object sent from the first device;
an encrypter which encrypts secret information by using the public key;
a transmitter which transmits a message including the encrypted secret information to the first device;
wherein the seed information includes device identification information of the first device, and
wherein the message is obtained by encrypting the secret information and the device identification information of the first device with the public key; and
a determination unit which determines based on the device identification information and a predetermined list whether or not the first device is a valid device,
wherein, as a result of the determination, only if the first device is valid, performing the generating of the public key, the encrypting of the secret information, and the transmitting of the message.

24. The apparatus of claim 20, wherein the seed information includes a master public key of the first device and IBE parameters used in the IBE scheme.

25. The apparatus of claim 20,
wherein the first device and the second device are UPnP (universal plug and play) devices, and
wherein the receiver receives the seed information through a device description of the first device.

26. The apparatus of claim 20, wherein the secret information is a session key to be used for communication between the first and second devices.

* * * * *